US012095216B2

(12) United States Patent
Chen

(10) Patent No.: US 12,095,216 B2
(45) Date of Patent: Sep. 17, 2024

(54) WIRE-END CONNECTOR AND CONNECTOR ASSEMBLY

(71) Applicant: BELLWETHER ELECTRONIC CORP., Taoyuan (TW)

(72) Inventor: Yen-An Chen, Taoyuan (TW)

(73) Assignee: BELLWETHER ELECTRONIC CORP., Taoyuan (TW)

( * ) Notice: Subject to any disclaimer, the term of this patent is extended or adjusted under 35 U.S.C. 154(b) by 346 days.

(21) Appl. No.: 17/849,973

(22) Filed: Jun. 27, 2022

(65) Prior Publication Data

US 2023/0065655 A1 Mar. 2, 2023

Related U.S. Application Data

(60) Provisional application No. 63/239,220, filed on Aug. 31, 2021.

(51) Int. Cl.

| | |
|---|---|
| ***H01R 43/16*** | (2006.01) |
| ***H01R 4/28*** | (2006.01) |
| ***H01R 13/516*** | (2006.01) |
| ***H01R 13/627*** | (2006.01) |

(52) U.S. Cl.

CPC ............... *H01R 43/16* (2013.01); *H01R 4/28* (2013.01); *H01R 13/516* (2013.01); *H01R 13/6271* (2013.01)

(58) Field of Classification Search

CPC ........ H01R 43/16; H01R 4/28; H01R 13/516; H01R 13/6271; H01R 12/707; H01R 12/75; H01R 13/6272

See application file for complete search history.

(56) References Cited

U.S. PATENT DOCUMENTS

| | | | | |
|---|---|---|---|---|
| 7,056,142 B2 * | 6/2006 | Ueda | H01R 13/6272 | 439/328 |
| 8,974,244 B2 * | 3/2015 | Aihara | H01R 12/724 | 439/374 |
| 9,997,854 B2 * | 6/2018 | Kobayashi | H01R 13/502 | |
| 10,164,377 B2 * | 12/2018 | Zhang | H01R 13/6456 | |
| 11,056,831 B2 * | 7/2021 | Mamiya | H01R 13/641 | |
| 11,177,607 B2 * | 11/2021 | Takayanagi | H01R 13/506 | |

* cited by examiner

*Primary Examiner* — Briggitte R. Hammond

(74) *Attorney, Agent, or Firm* — Li & Cai Intellectual Property (USA) Office

(57) ABSTRACT

A wire-end connector and a connector assembly are provided. The connector assembly includes the wire-end connector and a board-end connector. The wire-end connector includes a housing, multiple conductive wires, and multiple conductive terminals. The housing includes an insulating body with multiple apertures disposed therein, an elastic latch arm, and a flange. The flange is arranged along an outer side of a first opening, and two limiting arms are respectively formed at two end portions of the flange that are adjacent to the elastic latch arm. A midline is defined by each of first partition walls along a third direction, the two adjacent midlines are spaced apart from each other by an interval, and each of the intervals is at least twice a width of each of the first partition walls. The conductive terminals are disposed in the apertures, respectively.

17 Claims, 8 Drawing Sheets

WIRE-END CONNECTOR AND CONNECTOR ASSEMBLY

CROSS-REFERENCE TO RELATED PATENT APPLICATION

This application claims the benefit of priority to the U.S. Provisional Patent Application Ser. No. 63/239,220 filed on Aug. 31, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a wire-end connector and a connector assembly, and more particularly to a wire-end connector and a connector assembly that are not subject to bending or deformation during assembly or disassembly processes thereof.

BACKGROUND OF THE DISCLOSURE

With the advancement of technology, an exterior design of an electronic device has been developed toward being lighter, thinner, shorter, and smaller. This design trend has caused an interior of the electronic device and peripheral components thereof to be similarly developed toward miniaturization. For example, components such as connector assemblies (such as wire-end connectors and board-end connectors) are adapted for being applied in various electronic devices.

However, a user may have difficulty in operating a miniaturized connector assembly. That is, when the connector assembly is too small in size, mating or disassembly of the wire-end connector and the board-end connector cannot be easily performed by the user. Under improper force, a pressing portion of the wire-end connector may even be bent and deformed as a consequence.

Therefore, how to enhance operation convenience of the wire-end connector and the connector assembly through an improvement in structural design, so as to overcome the above-mentioned deficiencies, has become one of the issues to be solved for the miniaturized connector assembly.

SUMMARY OF THE DISCLOSURE

In response to the above-referenced technical inadequacies, the present disclosure provides a wire-end connector and a connector assembly that can be easily operated by users, so as to overcome technical issues concerning bending and deformation of a conventional connector when being too small in size for assembly or disassembly.

In one aspect, the present disclosure provides a wire-end connector, which includes a housing, a plurality of conductive wires, and a plurality of conductive terminals. The housing includes an insulating body, an elastic latch arm, and a flange. The insulating body has a first surface, a second surface, and a third surface that are arranged relative to each other, the first surface and the second surface are arranged opposite to each other, and the third surface is connected between the first surface and the second surface. The first surface has a first opening, the second surface has a second opening, and the first opening is in communication with the second opening. A plurality of first partition walls and a second partition wall are disposed inside the insulating body. The first partition walls extend along a first direction, the second partition wall extends along a second direction, and the first direction is perpendicular to the second direction. The first partition walls and the second partition wall are in an intersecting arrangement to divide the first opening into a plurality of apertures. One end of the elastic latch arm is connected to the third surface, and a pressing portion is formed at another end of the elastic latch arm. The flange is arranged along an outer side of the first opening, and two limiting arms are respectively formed at two end portions of the flange that are adjacent to the elastic latch arm. The pressing portion is located between the two limiting arms. One of a plurality of midlines is defined by each of the first partition walls along a third direction, the third direction is perpendicular to the first direction and the second direction, and any two adjacent ones of the midlines are spaced apart from each other by one of a plurality of intervals. Each of the intervals is at least twice a width of each of the first partition walls. The conductive wires are inserted into the apertures, respectively. The conductive terminals are disposed in the apertures, respectively. Further, the conductive terminals are respectively connected to the conductive wires.

In another aspect, the present disclosure provides a connector assembly, which includes a wire-end connector and a board-end connector. The wire-end connector includes a first housing, a plurality of conductive wires, and a plurality of first conductive terminals. The first housing includes an insulating body, an elastic latch arm, and a flange. The insulating body has a first surface, a second surface, and a third surface that are arranged relative to each other, the first surface and the second surface are arranged opposite to each other, the third surface is connected between the first surface and the second surface, the first surface has a first opening, the second surface has a second opening, and the first opening is in communication with the second opening. A plurality of first partition walls and a second partition wall are disposed inside the insulating body, the first partition walls extend along a first direction, the second partition wall extends along a second direction, the first direction is perpendicular to the second direction, and the first partition walls and the second partition wall are in an intersecting arrangement to divide the first opening into a plurality of apertures. One end of the elastic latch arm is connected to the third surface, a pressing portion is formed at another end of the elastic latch arm, the flange is arranged along an outer side of the first opening, two limiting arms are respectively formed at two end portions of the flange that are adjacent to the elastic latch arm, and the pressing portion is located between the two limiting arms. One of a plurality of midlines is defined by each of the first partition walls along a third direction, the third direction is perpendicular to the first direction and the second direction, any two adjacent ones of the midlines are spaced apart from each other by one of a plurality of intervals, and each of the intervals is at least twice a width of each of the first partition walls. The conductive wires are inserted into the apertures, respectively. The first conductive terminals are disposed in the apertures, respectively. Further, the first conductive terminals are respectively connected to the conductive wires. The board-end connector is mated with the wire-end connector, and includes a second housing and a plurality of second conductive terminals. The second housing has an accommodating groove, the second conductive terminals are disposed in the accommodating groove and are exposed from a bottom portion of the second housing, and the second conductive terminals are coupled to a circuit board. When the wire-end connector is mated with the board-end connector, the insulating body is inserted into the accommodating groove, so that the first conductive terminals are electrically connected to the second conductive terminals.

Therefore, in the wire-end connector and the connector assembly provided by the present disclosure, by virtue of one end of the elastic latch arm being connected to the third surface, the pressing portion being formed at another end of the elastic latch arm, the flange being arranged along the outer side of the first opening, the two limiting arms being respectively formed at the two end portions of the flange that are adjacent to the elastic latch arm, and the pressing portion being located between the two limiting arms, the elastic latch arm is restricted by the two limiting arms and does not easily bend or deform when being pulled by an external force.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
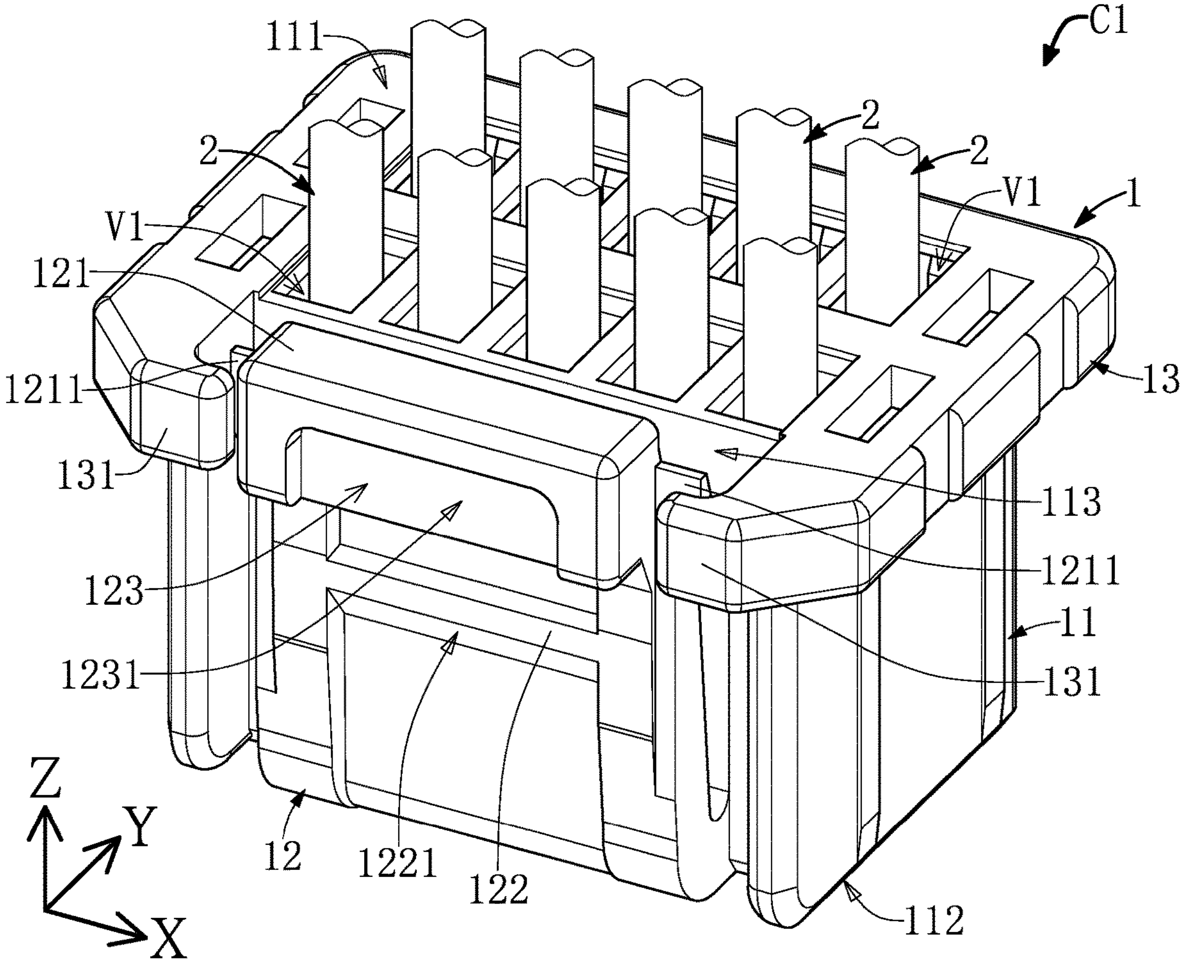
FIG. 1 is a schematic perspective view of a wire-end connector according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment

Figure 2:
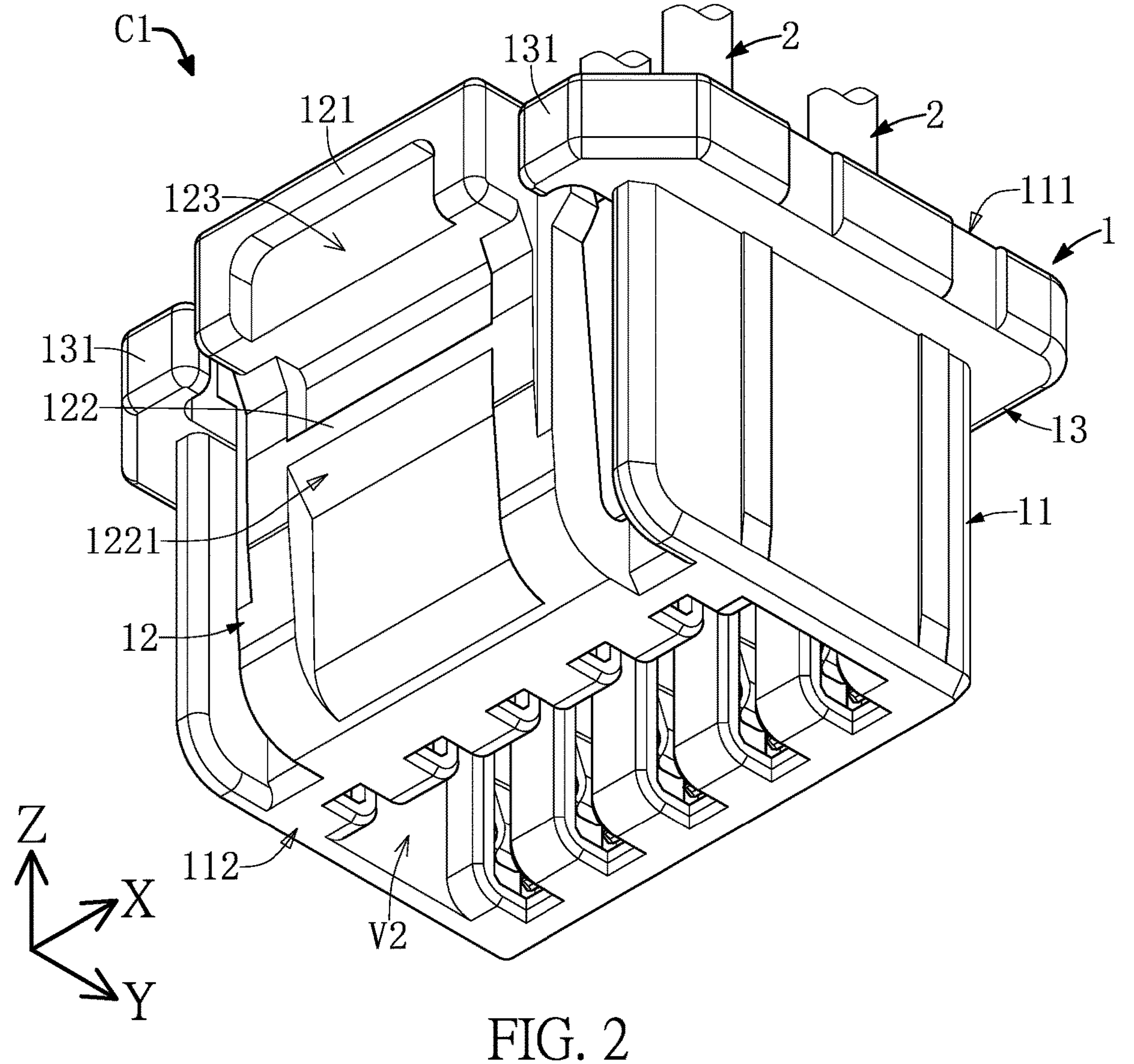
FIG. 2 is another schematic perspective view of the wire-end connector according to the present disclosure.
Figure 3:
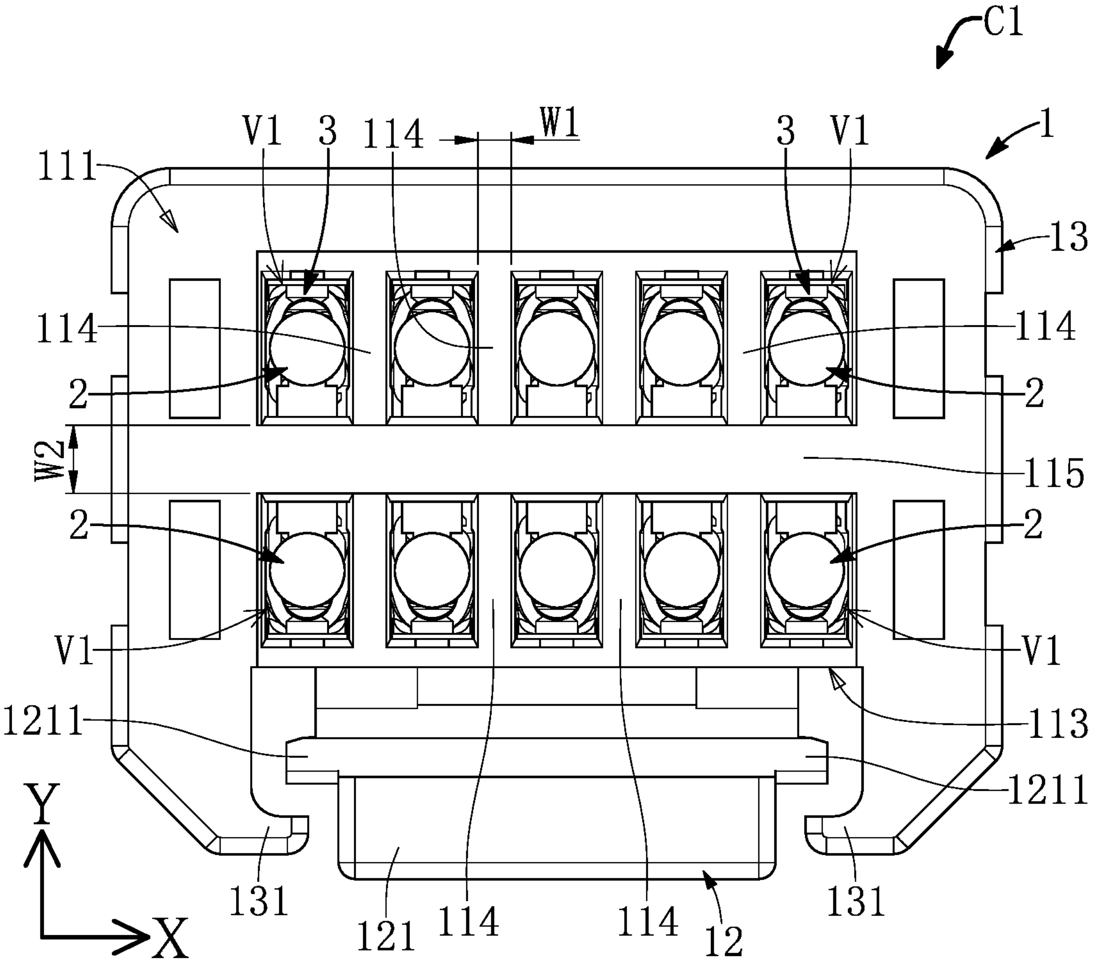
FIG. 3 is a schematic top view of the wire-end connector according to the present disclosure.
Figure 6:
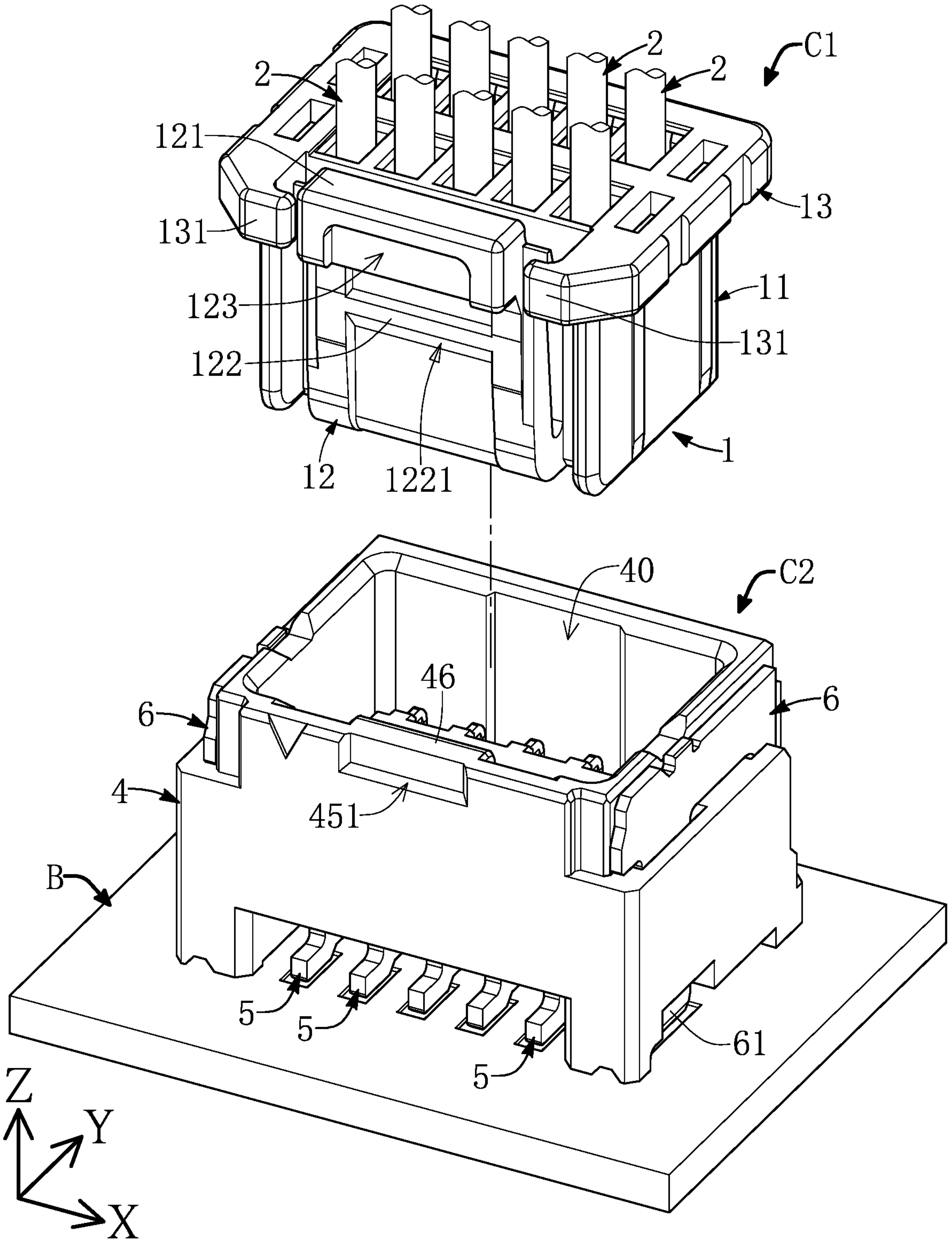
FIG. 6 is a schematic assembled view of the wire-end connector and the board-end connector according to the present disclosure.

The present disclosure provides a connector assembly, which includes a wire-end connector C1 and a board-end connector C2 that can be mated with each other (as shown in FIG. 6). Reference is made to FIG. 1 to FIG. 3, in which FIG. 1 is a schematic perspective view of a wire-end connector according to the present disclosure, FIG. 2 is another schematic perspective view of the wire-end connector according to the present disclosure, and FIG. 3 is a schematic top view of the wire-end connector according to the present disclosure. The wire-end connector C1 includes a first housing 1, a plurality of conductive wires 2, and a plurality of first conductive terminals 3. The first housing 1 includes an insulating body 11, an elastic latch arm 12, and a flange 13. The insulating body 11 has a first surface 111, a second surface 112, and a third surface 113 that are arranged relative to each other. The first surface 111 and the second surface 112 are arranged opposite to each other, and the third surface 113 is connected between the first surface 111 and the second surface 112. A first opening is formed on the first surface 111, and a second opening V2 is formed on the second surface 112.

As shown in FIG. 3, a plurality of first partition walls 114 and a second partition wall 115 are disposed inside the insulating body 11. The first partition walls 114 extend along a first direction (a Y-axis direction), the second partition wall 115 extends along a second direction (an X-axis direction), and the first direction is perpendicular to the second direction. The first partition walls 114 and the second partition wall 115 are in an intersecting arrangement, such that the first opening is divided into a plurality of apertures V1. In addition, the apertures V1 are in spatial communication with the second opening V2. For example, in the present embodiment, the apertures V1 include the apertures V1 of a first row and the apertures V1 of a second row that are arranged side by side. The first row and the second row each have five of the apertures V1, and the five apertures V1 of the first row respectively correspond to the five apertures V1 of the second row.

Referring to FIG. 1 and FIG. 2, one end of the elastic latch arm 12 is a fixed end, and the fixed end is connected to the third surface 113. Another end of the elastic latch arm 12 is a free end, and a pressing portion 121 is formed at the free end. The flange 13 is arranged along an outer side of the first opening, two limiting arms 131 are respectively formed at two end portions of the flange 13 that are adjacent to the elastic latch arm 12, and the pressing portion 121 is located between the two limiting arms 131. A height of the pressing portion 121 (i.e., a position on a negative Y-axis) is greater than heights of the two limiting arms 131. In other words, a distance along a negative Y-axis direction between a surface of the pressing portion 121 and the third surface 113 is greater than a distance along the negative Y-axis direction between a surface of the limiting arm 131 and the third surface 113. The conductive wires 2 are inserted into the apertures V1, respectively. The first conductive terminals 3 are also disposed in the apertures V1, respectively. In addition, the first conductive terminals 3 are respectively connected to the conductive wires 2. For example, in the present embodiment, a linewidth of a conductive wire material inside the conductive wire 2 is between 0.255 mm and 0.405 mm. However, the present disclosure is not limited by the size of the conductive wire material of the conductive wire 2.

Reference is further made to FIG. 1 and FIG. 3. The elastic latch arm 12 has two tab portions 1211 respectively formed on two sides of the pressing portion 121, and projection areas of the two tab portions 1211 projected onto the third surface 113 partially overlap with projection areas of the two limiting arms 131 projected onto the third surface 113, respectively. Therefore, when a user presses and then releases the pressing portion 121, the elastic latch arm 12 swings along the Y-axis direction, and a swinging range of the elastic latch arm 12 is limited due to being stopped by the two tab portions 1211. In this way, the elastic latch arm 12 can be prevented from being excessively bent away from the third surface 113 and damaged as a result of improper force being applied thereto. More specifically, the elastic latch arm 12 has a stop portion 122, and the pressing portion 121 has a first depression 123. Three sidewalls extend from a bottom surface 1231 of the first depression 123 all the way to one side of the pressing portion 121, such that the first depression 123 is defined by being surrounded by the three sidewalls. An inclined surface 1221 is formed at a side of the stop portion 122 that is distant from the first depression 123.

Figure 4:
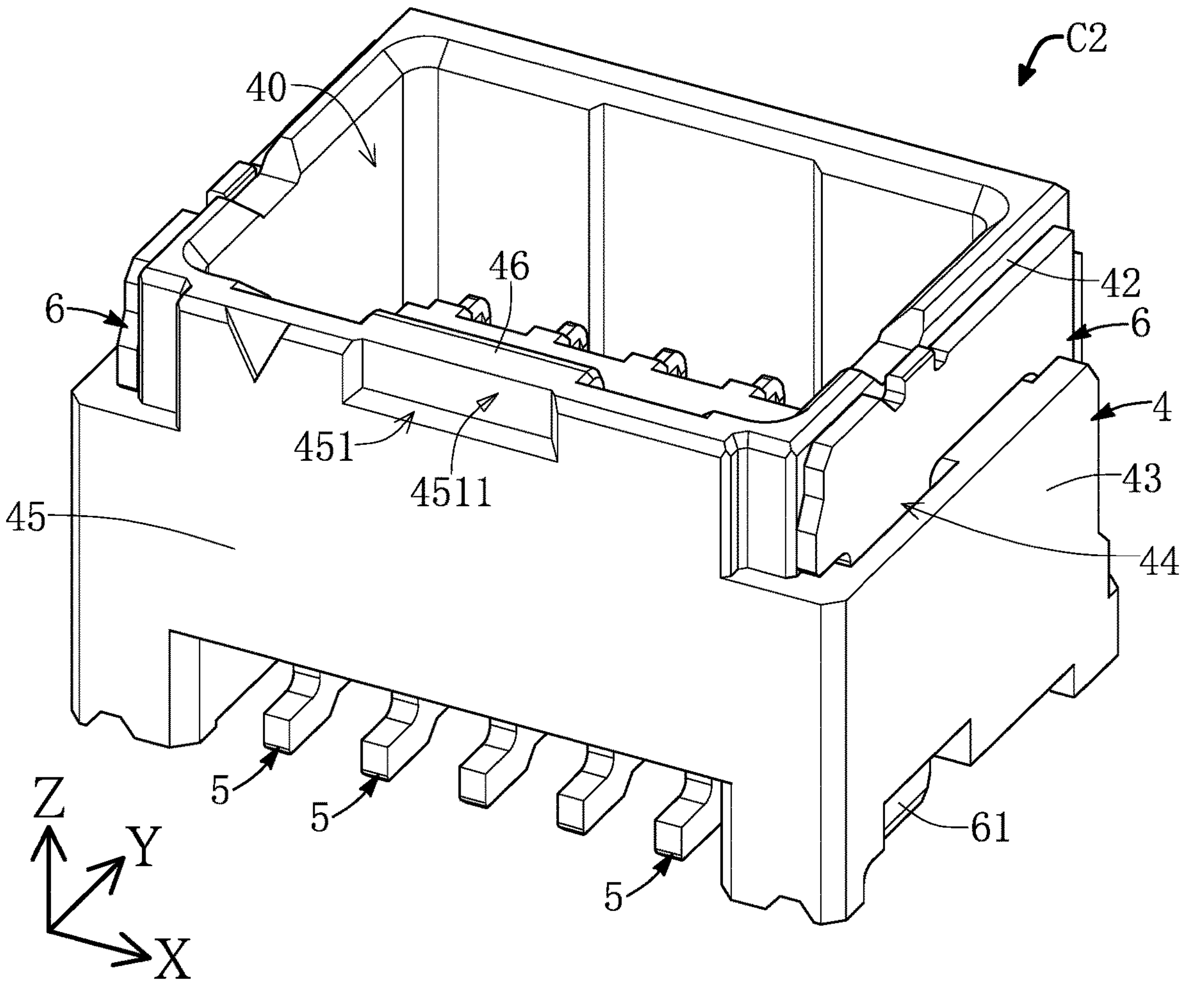
FIG. 4 is a schematic perspective view of a board-end connector according to the present disclosure.
Figure 5:
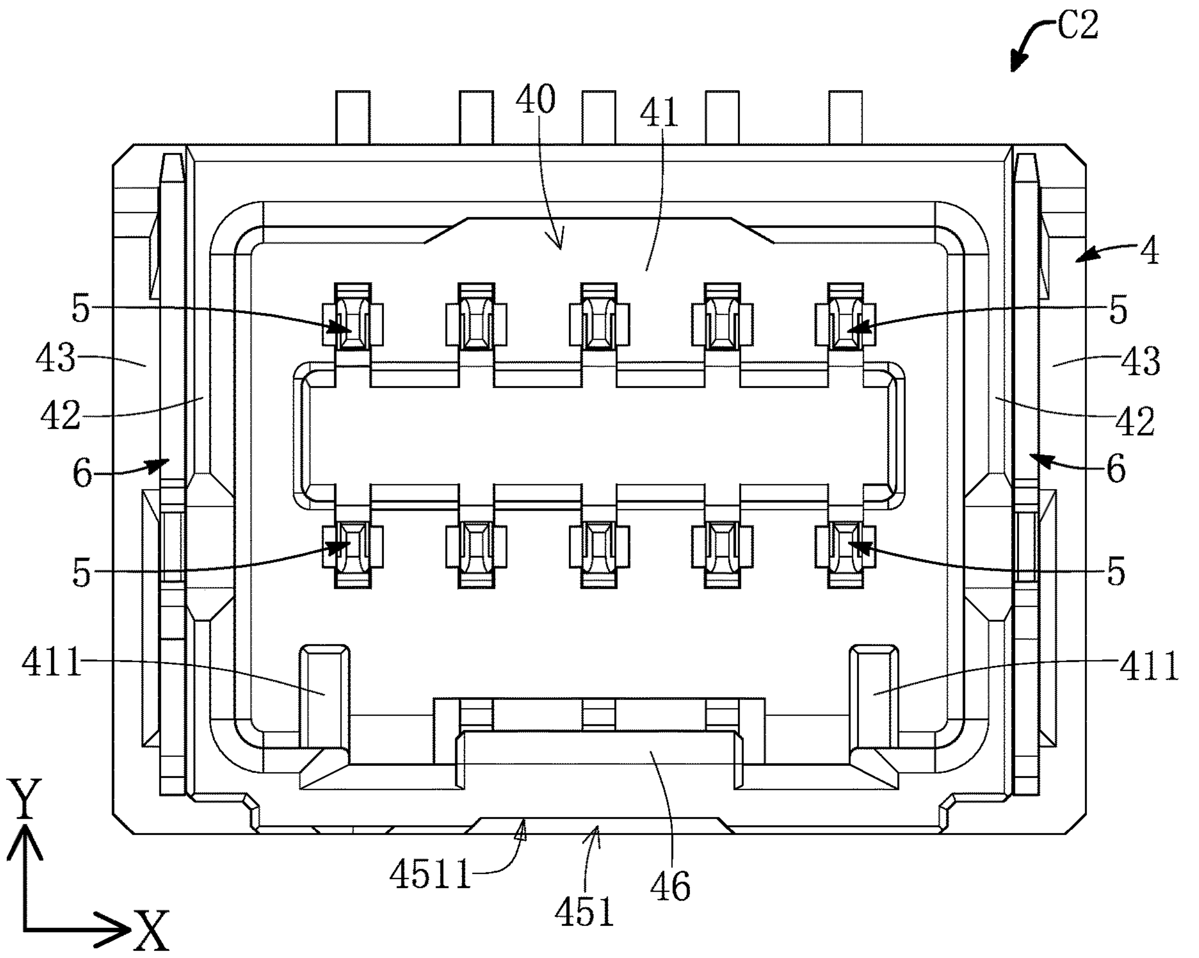
FIG. 5 is a schematic top view of the board-end connector according to the present disclosure.

Reference is made to FIG. 4 and FIG. 5, in which FIG. 4 is a schematic perspective view of a board-end connector according to the present disclosure, and FIG. 5 is a schematic top view of the board-end connector according to the present disclosure. The board-end connector C2 includes a second housing 4 and a plurality of second conductive terminals 5. The second housing 4 has an accommodating groove 40, and the second conductive terminals 5 are disposed in the accommodating groove 40 and are exposed from a bottom portion 41 of the second housing 4. The second conductive terminals 5 are electrically connected to a circuit board B by soldering (as shown in FIG. 6), but the present disclosure is not limited thereto. Specifically, as shown in FIG. 4, the second housing 4 has first side walls 42 at two sides thereof and a second side wall 45. In addition, two flange walls 43 are respectively formed on the two first side walls 42, and the second side wall 45 is connected between the two flange walls 43. A hollow groove 44 is formed between each of the first side walls 42 and a corresponding one of the flange walls 43. The board-end connector C2 further includes two fixing members 6. The two fixing members 6 are respectively inserted into the two hollow grooves 44, and soldering portions 61 of the two fixing members 6 are exposed from the bottom of the second housing 4. The two fixing members 6 are soldered onto the circuit board B through their respective soldering portions 61, so as to enhance the structural strength of the board-end connector C2 being fixed onto the circuit board B.

Referring to FIG. 4 and FIG. 5, the second housing 4 has a second depression 451 formed on the second side wall 45. Three sidewalls extend from a bottom surface 4511 of the second depression 451 all the way to one side of the second housing 4, such that the second depression 451 is defined by being surrounded by the three sidewalls. In addition, the second housing 4 has a hook portion 46. The hook portion 46 is formed on a groove wall of the accommodating groove 40, and is adjacent to the second depression 451. From another perspective, the hook portion 46 is formed inside the accommodating groove 40 and protrudes along an inward direction (a positive Y-axis direction). The hook portion 46 is disposed adjacent to a groove opening of the accommodating groove 40. Two limiting posts 411 are further formed on the groove wall of the accommodating groove 40, and the hook portion 46 is located between the two limiting posts 411.

Figure 7:
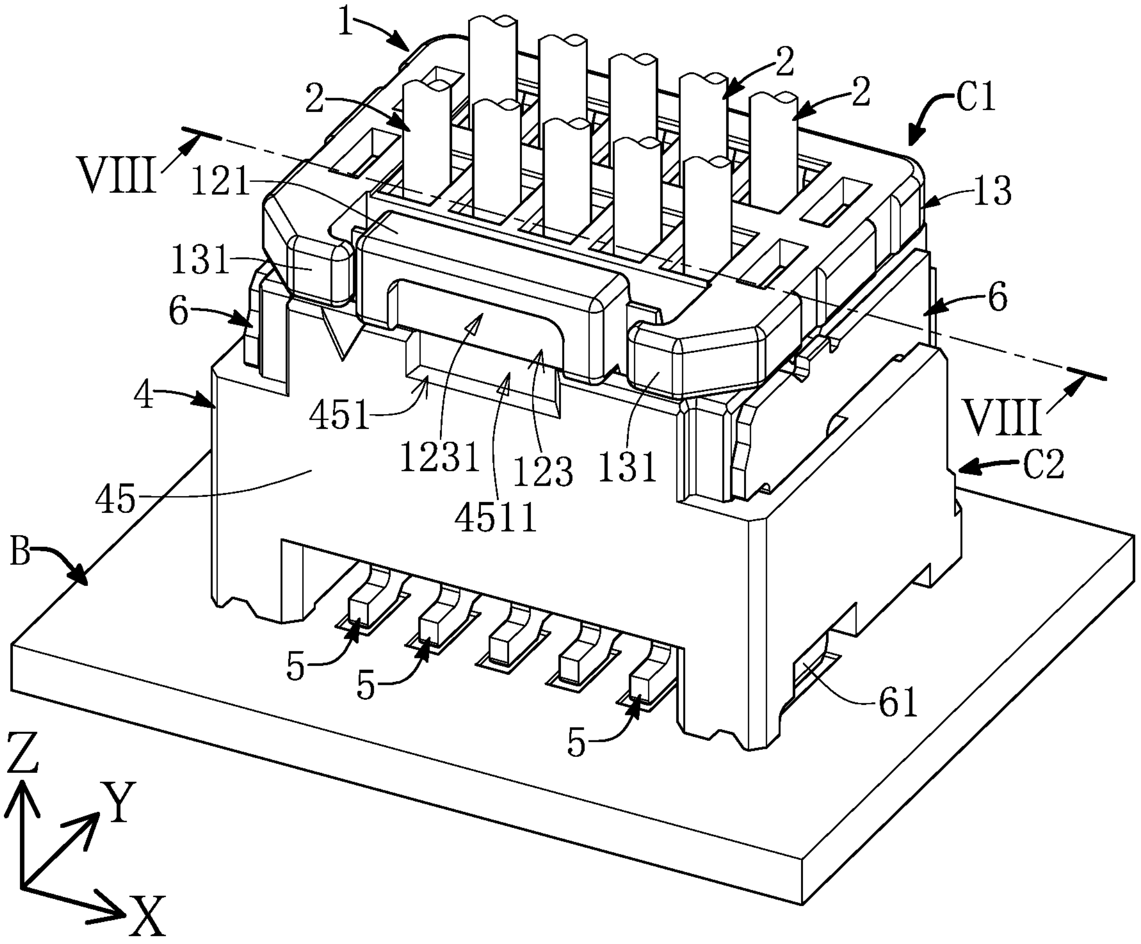
FIG. 7 is a schematic perspective view of a connector assembly according to the present disclosure.

Reference is made to FIG. 5, FIG. 6, and FIG. 7, in which FIG. 6 is a schematic assembled view of the wire-end connector and the board-end connector according to the present disclosure, and FIG. 7 is a schematic perspective view of a connector assembly according to the present disclosure. When the wire-end connector C1 is mated with the board-end connector C2, the insulating body 11 is inserted into the accommodating groove 40, so that the first conductive terminals 3 of the wire-end connector C1 are electrically connected to the second conductive terminals 5 of the board-end connector C2 and the elastic latch arm 12 is located between the two limiting posts 411. It is worth mentioning that when the insulating body 11 is inserted into the accommodating groove 40, the first depression 123 and the second depression 451 are disposed adjacent to each other, so as to jointly form a pressing groove. Further, a vertical distance (i.e., a positional distance on the Y axis) between the bottom surface 4511 of the second depression 451 and the second side wall 45 is greater than or equal to a vertical distance between the bottom surface 1231 of the first depression 123 and the second side wall 45. In other words, a concave degree of the second depression 451 is greater than that of the first depression 123 (i.e., the bottom surface 4511 of the second depression 451 is lower than the bottom surface 1231 of the first depression 123), or the concave degree of the second depression 451 is equal to that of the first depression 123 (i.e., the bottom surface 4511 of the second depression 451 is flush with the bottom surface 1231 of the first depression 123). In addition, a width of the first depression 123 (i.e., a width of the first depression 123 along the X-axis direction) is greater than or equal to a width of the second depression 451.

As shown in FIG. 6, the wire-end connector C1 is mated with the board-end connector C2 along a negative Z-axis mating direction. At this time, the inclined surface 1221 of the stop portion 122 faces toward the board-end connector C2. That is, a height of the inclined surface 1221 is decreased along said mating direction. Through the configuration of the inclined surface 1221, a smoothness of the mating between the wire-end connector C1 and the board-end connector C2 can be improved. Moreover, when the wire-end connector C1 is mated with the accommodating groove 40 of the board-end connector C2 through the insulating body 11, another side of the stop portion 122 (which is relative to the inclined surface 1221) abuts against the hook portion 46, thereby fixing the wire-end connector C1 with the board-end connector C2. More specifically, when the wire-end connector C1 is to be detached from the board-end connector C2, the stop portion 122 can be released from the hook portion 46 by the user pressing the pressing portion 121 on the wire-end connector C1. In this way, the wire-end connector C1 can be directly separated from board-end connector C2. For example, due to a size limitation of the connector assembly of the present disclosure, an area of a flat part of the pressing portion 121 is relatively small, which causes positioning difficulty for a finger of the user when pressing the pressing portion 121 by the finger. This can also cause the user to feel pain since force cannot be easily applied during such an action. In the present disclosure, through the configuration of the first depression 123 and the second depression 451, structural alignment can be conveniently achieved by the user when the wire-end connector C1 is being mated with the board-end connector C2. Moreover, the area of the flat part of the pressing portion 121 is enlarged when the first depression 123 and the second depression 451 are disposed adjacent to each other and jointly form the pressing groove. Therefore, when the finger of the user is pressed onto the pressing portion 121, the area of the flat part that comes in contact with the finger is increased, thereby reducing any discomfort experienced through the finger of the user.

Figure 8:
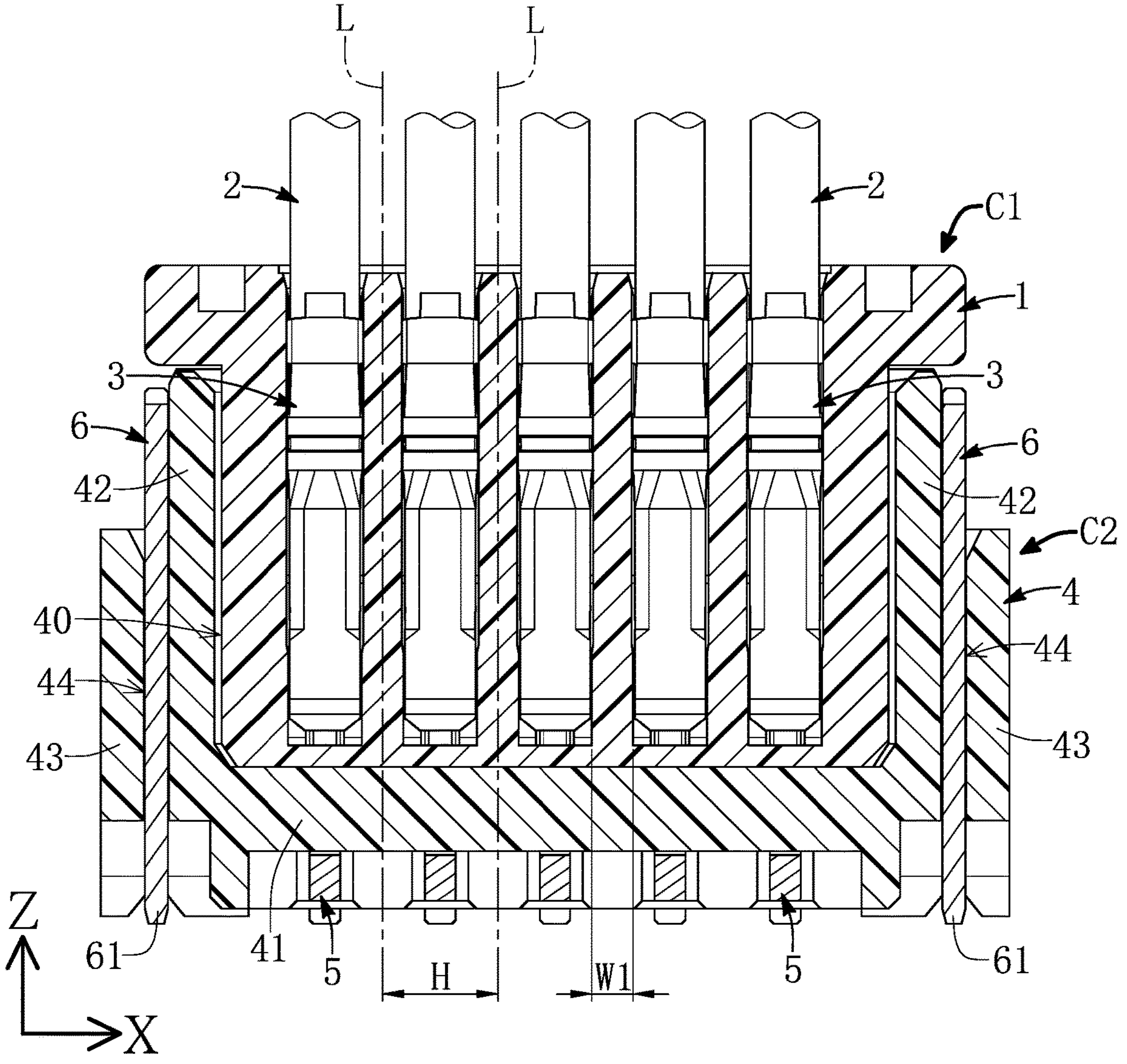
FIG. 8 is a schematic cross-sectional view taken along line VIII-VIII of FIG. 7.

Reference is made to FIG. 3, FIG. 7, and FIG. 8, in which FIG. 8 is a schematic cross-sectional view taken along line VIII-VIII of FIG. 7. A midline L is defined by each of the first partition walls 114 along a third direction (a Z-axis direction), and the third direction is perpendicular to the first direction and the second direction. The two adjacent midlines L are spaced apart from each other by an interval H, and each of the intervals H is at least twice a width W1 of each of the first partition walls 114. A width W2 of the second partition wall 115 is greater than the width W1 of each of the first partition walls 114. For example, in the present embodiment, the width W1 of each of the first partition walls 114 is greater than or equal to 0.5 mm, and the width W2 of the second partition wall 115 is greater than or equal to 0.8 mm, but the present disclosure is not limited thereto. In addition, the connector assembly (i.e., the wire-end connector C1 and the board-end connector C2 that are assembled together in FIG. 7) of the present disclosure generally has a length (along the X-axis direction) of around 11.85 mm, a width (along the Y-axis direction) of around 8.7 mm, and a height (along the Z-axis direction) of around 9.2 mm. Compared with the connector assembly of the present disclosure, a connecting conductive wire of a conventional wire-end connector of the same size usually has a thicker linewidth, but only at the cost of sacrificing a thickness of a dividing wall inside a housing of the wire-end connector. As such, a withstand voltage (referring to the capability of conductive terminals inside the connector and an insulating housing to withstand a rated test voltage) of the conventional wire-end connector is relatively lower. In the connector assembly of the present disclosure, the width W1 of the first partition wall 114 inside the wire-end connector is greater than or equal to 0.5 mm, and the width W2 of the second partition wall 115 is greater than or equal to 0.8 mm. Since the width W1 and the width W2 are much greater when compared with the conventional technology, a higher withstand voltage can be obtained. Moreover, through the interval H being configured to be at least twice the width W1 of the first partition wall 114, a balance between the conductive wires 2 and the first partition walls 114 can be achieved. In this way, not only can the connector assembly of the present disclosure withstand a higher withstand voltage, but an electric current value that can be sustained by conductive wires of the connector assembly will not be unduly low.

Beneficial Effects of the Embodiment

In conclusion, in the wire-end connector C1 and the connector assembly provided by the present disclosure, by virtue of one end of the elastic latch arm 12 being connected to the third surface 113, the pressing portion 121 being formed at another end of the elastic latch arm 12, the flange 13 being arranged along the outer side of the first opening, the two limiting arms 131 being respectively formed at the two end portions of the flange 13 that are adjacent to the elastic latch arm 12, and the pressing portion 121 being located between the two limiting arms 131, the elastic latch arm 12 is restricted by the two limiting arms 131 and does not easily bend or deform when being turned outward by an external force. Accordingly, the elastic latch arm 12 can be better protected.

More specifically, in the present disclosure, the midline L is defined by each of the first partition walls 114 along the third direction (the Z-axis direction), and the third direction is perpendicular to the first direction and the second direction. The two adjacent midlines L are spaced apart from each other by the interval H, and each of the intervals H is at least twice the width W1 of each of the first partition walls 114.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wire-end connector, comprising:

a housing including an insulating body, an elastic latch arm, and a flange, wherein the insulating body has a first surface, a second surface, and a third surface that are arranged relative to each other, the first surface and the second surface are arranged opposite to each other, the third surface is connected between the first surface and the second surface, the first surface has a first opening, the second surface has a second opening, and the first opening is in communication with the second opening; wherein a plurality of first partition walls and a second partition wall are disposed inside the insulating body, the first partition walls extend along a first direction, the second partition wall extends along a second direction, the first direction is perpendicular to the second direction, and the first partition walls and the second partition wall are in an intersecting arrangement to divide the first opening into a plurality of apertures; wherein one end of the elastic latch arm is connected to the third surface, a pressing portion is formed at another end of the elastic latch arm, the flange is arranged along an outer side of the first opening, two limiting arms are respectively formed at two end portions of the flange that are adjacent to the elastic latch arm, and the pressing portion is located between the two limiting arms; wherein one of a plurality of midlines is defined by each of the first partition walls along a third direction, the third direction is perpendicular to the first direction and the second direction, any two adjacent ones of the midlines are spaced apart from each other by one of a plurality of intervals, and each of the intervals is at least twice a width of each of the first partition walls;

a plurality of conductive wires being inserted into the apertures, respectively; and a plurality of conductive terminals being disposed in the apertures, respectively, wherein the conductive terminals are respectively connected to the conductive wires.

2. The wire-end connector according to claim 1, wherein the apertures include the apertures of a first row and the apertures of a second row that are arranged side by side, the first row and the second row each have five of the apertures, and the five apertures of the first row respectively correspond to the five apertures of the second row.

3. The wire-end connector according to claim 1, wherein the elastic latch arm has two tab portions respectively formed on two sides of the pressing portion, and projection areas of the two tab portions projected onto the third surface partially overlap with projection areas of the two limiting arms projected onto the third surface, respectively.

4. The wire-end connector according to claim 1, wherein the pressing portion has a depression, the elastic latch arm has a stop portion, and an inclined surface is formed at a side of the stop portion that is distant from the depression.

5. The wire-end connector according to claim 1, wherein a width of the second partition wall is greater than the width of each of the first partition walls.

6. The wire-end connector according to claim 5, wherein the width of each of the first partition walls is greater than or equal to 0.5 mm, and the width of the second partition wall is greater than or equal to 0.8 mm.

7. The wire-end connector according to claim 1, wherein a linewidth of a conductive wire material inside each of the conductive wires is between 0.255 mm and 0.405 mm.

8. A connector assembly, comprising:

a wire-end connector, wherein the wire-end connector includes:

a first housing including an insulating body, an elastic latch arm, and a flange, wherein the insulating body has a first surface, a second surface, and a third surface that are arranged relative to each other, the first surface and the second surface are arranged opposite to each other, the third surface is connected between the first surface and the second surface, the first surface has a first opening, the second surface has a second opening, and the first opening is in communication with the second opening; wherein a plurality of first partition walls and a second partition wall are disposed inside the insulating body, the first partition walls extend along a first direction, the second partition wall extends along a second direction, the first direction is perpendicular to the second direction, and the first partition walls and the second partition wall are in an intersecting arrangement to divide the first opening into a plurality of apertures; wherein one end of the elastic latch arm is connected to the third surface, a pressing portion is formed at another end of the elastic latch arm, the flange is arranged along an outer side of the first opening, two limiting arms are respectively formed at two end portions of the flange that are adjacent to the elastic latch arm, and the pressing portion is located between the two limiting arms; wherein one of a plurality of midlines is defined by each of the first partition walls along a third direction, the third direction is perpendicular to the first direction and the second direction, any two adjacent ones of the midlines are spaced apart from each other by one of a plurality of intervals, and each of the intervals is at least twice a width of each of the first partition walls;

a plurality of conductive wires being inserted into the apertures, respectively; and a plurality of first conductive terminals being disposed in the apertures, respectively, wherein the first conductive terminals are respectively connected to the conductive wires; and a board-end connector, wherein the board-end connector is mated with the wire-end connector, the board-end connector includes a second housing and a plurality of second conductive terminals, the second housing has an accommodating groove, the second conductive terminals are disposed in the accommodating groove and are exposed from a bottom portion of the second housing, and the second conductive terminals are electrically connected to a circuit board;

wherein, when the wire-end connector is mated with the board-end connector, the insulating body is inserted into the accommodating groove, so that the first conductive terminals are electrically connected to the second conductive terminals.

9. The connector assembly according to claim 8, wherein the board-end connector further includes a plurality of fixing members, a plurality of hollow grooves are formed at an outer side of the second housing, the fixing members are respectively inserted into the hollow grooves, and the fixing members are soldered onto the circuit board.

10. The connector assembly according to claim 8, wherein the apertures include the apertures of a first row and the apertures of a second row that are arranged side by side, the first row and the second row each have five of the apertures, and the five apertures of the first row respectively correspond to the five apertures of the second row.

11. The connector assembly according to claim 8, wherein the elastic latch arm has two tab portions respectively formed on two sides of the pressing portion, and projection areas of the two tab portions projected onto the third surface partially overlap with projection areas of the two limiting arms projected onto the third surface, respectively.

12. The connector assembly according to claim 8, wherein the pressing portion has a first depression, and a second depression is formed on a side wall of the second housing; wherein, when the insulating body is inserted into the accommodating groove, the first depression and the second depression are disposed adjacent to each other to jointly form a pressing groove.

13. The connector assembly according to claim 12, wherein a vertical distance between a bottom surface of the second depression and the side wall of the second housing is greater than or equal to a vertical distance between a bottom surface of the first depression and the side wall of the second housing.

14. The connector assembly according to claim 12, wherein the elastic latch arm has a stop portion, and an inclined surface is formed at a side of the stop portion that is distant from the first depression.

15. The connector assembly according to claim 14, wherein the second housing has a hook portion, and the hook portion is formed on a groove wall of the accommodating groove and is adjacent to the second depression; wherein, when the wire-end connector is mated with the accommodating groove of the board-end connector through the insulating body, the stop portion abuts against the hook portion.

16. The connector assembly according claim 8, wherein a width of the second partition wall is greater than the width of each of the first partition walls.

17. The connector assembly according to claim 8, wherein a linewidth of a conductive wire material inside each of the conductive wires is between 0.255 mm and 0.405 mm.

* * * * *